A. C. Semple. Sheet 2. 2 Sheets.
Paper Cutting Mach.
Nº 19,654. Patented Mar. 16, 1858.
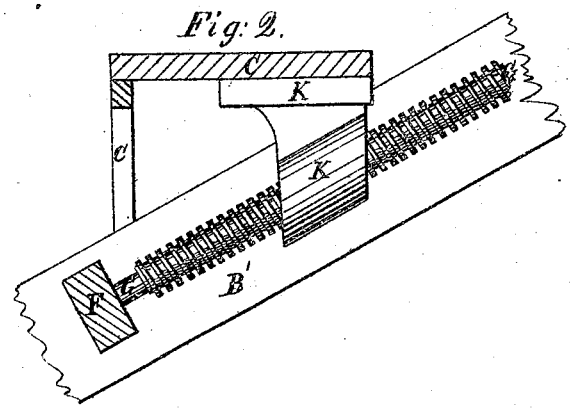
Fig: 2.
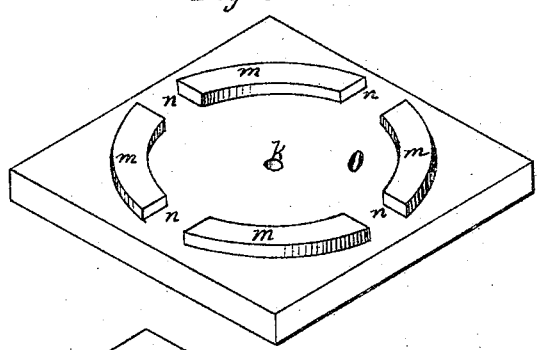
Fig: 3.
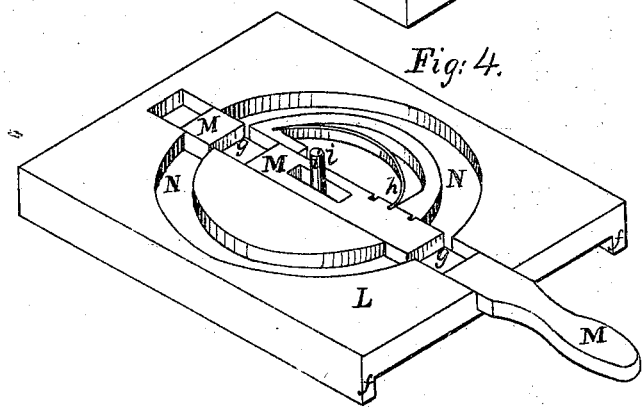
Fig: 4.

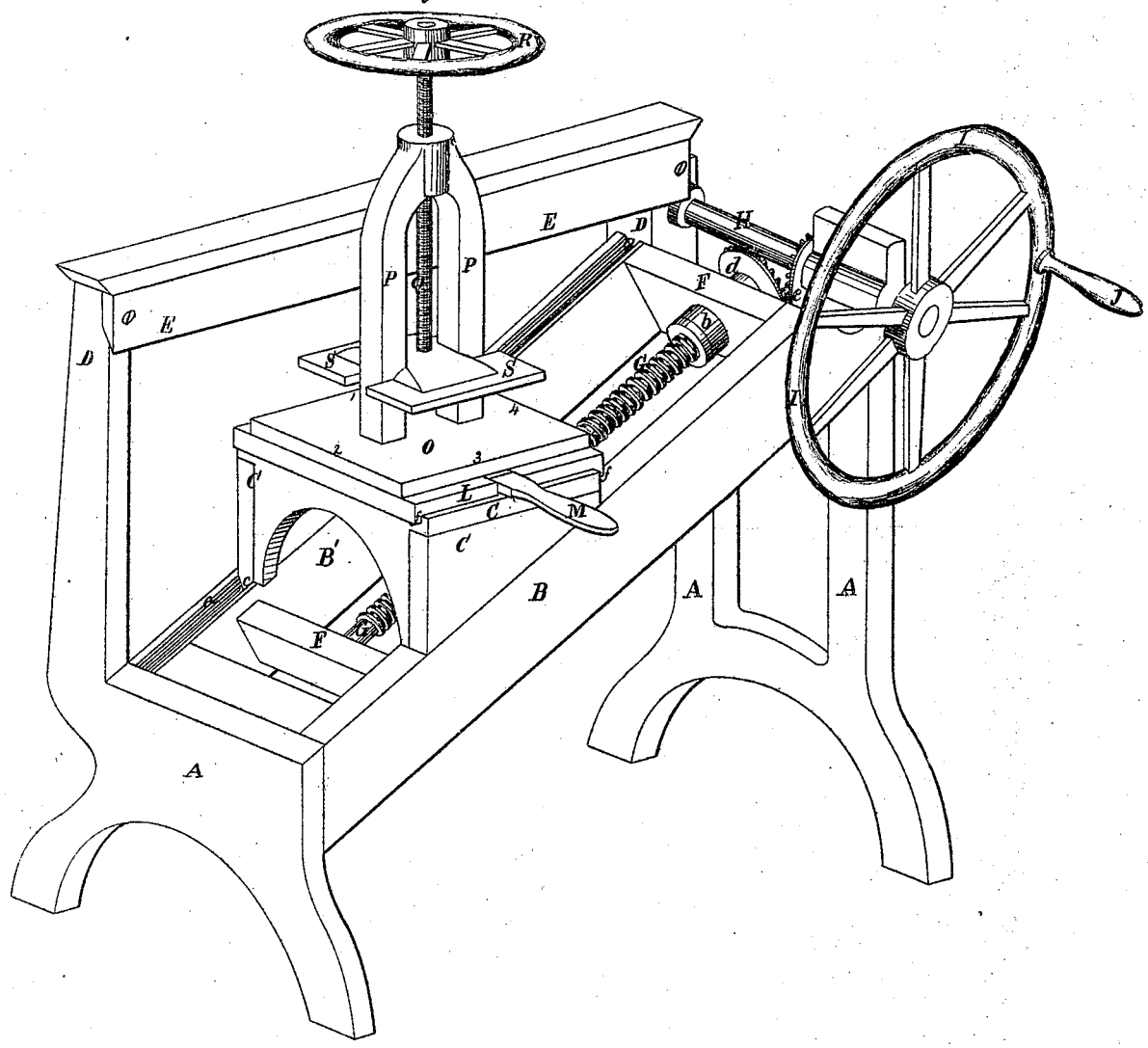

UNITED STATES PATENT OFFICE.

A. C. SEMPLE, OF NEW YORK, N. Y.

MACHINE FOR TRIMMING BOOKS.

Specification of Letters Patent No. 19,654, dated March 16, 1858.

*To all whom it may concern:*

Be it known that I, AMZI C. SEMPLE, of New York, in the county of New York and State of New York, have invented certain new and useful Improvements in Machines for Trimming Books, Cutting Paper, etc.; and I do hereby declare the following to be a full, clear, and exact description of the construction and operation of the same, reference being had to the accompanying drawings, making a part of this specification, in which—

Figure 1 represents a perspective view of the machine. Figs. 2, 3 and 4, represent detached portions thereof which will be specially referred to.

Similar letters of reference where they occur in the separate figures, denote like parts of the machine in all of them.

The nature of my invention consists, in mounting the carriage or table, which holds the books, paper, or other material to be cut, and moving it, on inclined ways, against the knife or cutter, by which means the necessary draw cut is produced.

To enable others skilled in the art to make and use my invention, I will proceed to describe the same with reference to the drawings.

A, A, represent the end supports of a properly constructed frame, to which are attached the inclined side rails B, B', to form an inclined plane, or ways, upon which the table or carriage C, moves. To the upright portions D, D, of this frame, is attached a knife E that may have a horizontal edge, or any inclination other than that of the rails B, B', so that a draw-cut may be effected. One of the rails (B) may have a plain top surface, and the other one (B') may have a groove $a$ formed in it, into which a projection $c$, on the carriage may fit and move to properly guide said carriage in its movement.

In the cross pieces F F, which are formed to, or a part of, the rails, are suitable bearings ($b$) for receiving the journals of a screw shaft G, provided with a single or double screw thread as may be preferred, or as the necessary speed of the carriage which is driven by it may require. And on the upper end of this screw shaft G, there is a bevel gear or pinion $d$, into which works a bevel gear $e$ mounted on the driving shaft H, through which and through said gears the screw shaft G is rotated. When the machine is operated by hand a fly or balance wheel I, and crank handle J, may be used. When driven by any other power a pulley may be placed on the shaft H, over which a belt from any first mover may pass—a loose pulley can also be arranged on the shaft along side of the fast one, and an automatic shipper arranged to move said belt, to throw the machine into or out of gear as may be desired—these appliances being well known to mechanicians.

To the underside of the table is secured a nut K through which the screw shaft G works and by which the table is moved up or down on the inclined plane, to bring the books, paper or whatever is to be cut to the knife E. On top of the table is a plate L, having flanges $f$, on two of its sides so that it may be held, and moved toward and from the knife, at right angles thereto. On top of this plate L, as seen in Fig. 4, there is a slide, catch, stop, or gage M, which can move in a recess or gain formed in said plate; and there is also formed in the top of said plate, a circular groove or way N, which is continuous when the slide M, is forced in until its recesses $g$ $g$, come in the line of said circular recess N, but when the slide M, is forced out by its spring $h$ as seen in Fig. 4, then the circular way is interrupted at two points.

$i$ is a pin or stud, which enters a hole $k$, in the revolving part O, of the carriage or table the under surface of which is shown in Fig. 3, the top part being seen in Fig. 1. On the underside of this revolving part $o$, there are four ledges $m$, $m$, $m$, $m$, which are segments of the same circle, and which fit, and move in the circular groove N, of the plate L, when they are laid into it, and through the opposite spaces $n$, $n$ between these segments the slide, catch, stop, or gage M, moves, so that when the recesses $g$, in said slide are in the line of the circular groove N then the plate O, can move around its center pin $i$, uninterruptedly, but when the slide M, is in the position shown in Fig. 4, and which it has by the spring $h$ then the plate O, can only move until its segments strike against the slide, and it is there firmly held, until released by forcing in the slide again. By this means the turning top O, is capable of being moved 90° degrees at a time, thus bringing up its four sides 1, 2, 3, 4, successively, under the knife E, and at right angles thereto, so that the book, books, or paper shall be properly trimmed or cut.

On top of the plate O, there are brackets P P, having a female screw formed in their top portion through which a screw rod or shaft Q, passes said screw rod, having a hand wheel R, on its upper end, and a clamping board S, on its lower end.

The operation of the machine is as follows: The books, paper, or whatever is to be operated upon, being properly laid upon the four sides (or any of them) 1, 2, 3, 4, of the turning table O, the clamp S, is run down to hold them firmly. The shaft H, is then set in motion, which through the described connections, draws the carriage C, up the inclined plane, and brings the paper &c, against the knife or cutter E, which severs the excess or trims the edges. When the knife has passed through the material, the carriage is run back down the inclined plane or ways—the slide M, forced in by the hand or otherwise and the turning table revolved 90°, degrees, bringing its edge or side 2 with its contents under the knife, when another similar cutting or trimming operation is done, and the table run back, and set for the third, and fourth similar operation, and thus one, two three, four, or even more, piles of books or paper may be trimmed or cut, before removing those previously operated upon. The motion of the carriage C, may be very fast—either by doubling the screw threads on the shaft G, or enlarging the bevel gear e, or running the shaft H, faster, and although I have represented the knife or cutter E as stationary, yet I should deem it as involving my invention, if it were made movable, and forced to or from the table, by any of the moving parts of the machine, which could readily be done, and provided it were used in connection with a table moving on an inclined plane as herein represented.

Having thus fully described the nature and object of my invention, what I claim therein as new and desire to secure by Letters Patent is—

Bringing the table or carriage which contains the books or paper to be cut, to the knife, by moving it up an inclined plane, by means substantially such as herein described.

A. C. SEMPLE.

Witnesses:
A. B. STOUGHTON,
THOS. H. UEPPERMAN.